United States Patent
Park et al.

(10) Patent No.: US 10,370,034 B2
(45) Date of Patent: Aug. 6, 2019

(54) VEHICLE BODY REINFORCEMENT STRUCTURE CORRESPONDING TO SMALL OVERLAP COLLISION

(71) Applicants: Hyundai Motor Company, Seoul (KR); Kia Motors Corporation, Seoul (KR)

(72) Inventors: Ji Woong Park, Hwaseong-si (KR); Sun Ik Jang, Seoul (KR); Jae Kap Joo, Seoul (KR); Jong Seop Song, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 69 days.

(21) Appl. No.: 15/653,172

(22) Filed: Jul. 18, 2017

(65) Prior Publication Data

US 2018/0170437 A1 Jun. 21, 2018

(30) Foreign Application Priority Data

Dec. 15, 2016 (KR) .................. 10-2016-0171855

(51) Int. Cl.
| | | |
|---|---|---|
| *B62D 21/15* | (2006.01) | |
| *B62D 27/02* | (2006.01) | |
| *B62D 21/02* | (2006.01) | |
| *B60R 19/24* | (2006.01) | |
| *B62D 25/08* | (2006.01) | |
| *B60R 19/34* | (2006.01) | |

(52) U.S. Cl.
CPC ............ *B62D 21/152* (2013.01); *B60R 19/24* (2013.01); *B62D 21/02* (2013.01); *B62D 25/082* (2013.01); *B62D 27/023* (2013.01); *B60R 19/34* (2013.01)

(58) Field of Classification Search
CPC .... B62D 21/152; B62D 27/023; B62D 21/02; B62D 25/082; B60R 19/24; B60R 19/34
See application file for complete search history.

(56) References Cited

U.S. PATENT DOCUMENTS

| | | |
|---|---|---|
| 7,469,956 B2 | 12/2008 | Yasuhara et al. |
| 2014/0062106 A1* | 3/2014 | Han ................. B60R 19/34 |
| | | 293/133 |
| 2016/0176442 A1* | 6/2016 | Miyagano ........... B62D 21/152 |
| | | 296/193.09 |

FOREIGN PATENT DOCUMENTS

| | | |
|---|---|---|
| JP | 2007-245859 A | 9/2007 |
| KR | 10-2012-0002132 A | 1/2012 |
| KR | 10-1518925 B1 | 5/2015 |

* cited by examiner

*Primary Examiner* — D Glenn Dayoan
*Assistant Examiner* — Melissa A Black
(74) *Attorney, Agent, or Firm* — Morgan, Lewis & Bockius LLP

(57) ABSTRACT

A vehicle body reinforcement structure corresponding to a small overlap collision may include side members whose front end surface is bonded to a rear surface of a crash box bracket; an external cover whose upper and external edge portions of a front surface are bonded to a rear surface of the crash box bracket; and a fender apron member that is disposed at the outside of the side member and in which at an upper end portion of the front side, an upper bonding portion that is bonded to an upper portion of the external cover, a lower bonding portion and that is bonded to a lower portion of a rear surface of the external cover are formed, and a slanted bonding portion that is bonded to the cover slanted surface of the external cover are formed.

11 Claims, 5 Drawing Sheets

VEHICLE BODY REINFORCEMENT STRUCTURE CORRESPONDING TO SMALL OVERLAP COLLISION

CROSS-REFERENCE(S) TO RELATED APPLICATIONS

The present application claims priority to Korean Patent Application No. 10-2016-0171855 filed on Dec. 15, 2016, the entire contents of which are incorporated herein for all purposes by this reference.

BACKGROUND OF THE INVENTION

Field of the Invention

The present invention relates to a vehicle body reinforcement structure corresponding to a small overlap collision. More particularly, the present invention relates to a vehicle body reinforcement structure corresponding to a small overlap collision that improves a collision performance upon colliding with a small overlap barrier, when a front side small overlap collision occurs.

Description of Related Art

In general, the front side of a vehicle body of a vehicle is located at the front side in a length direction of the vehicle to be a frame structure of the vehicle that forms an engine compartment, and includes a front end module that forms the front side of the engine compartment in which a cooling module and a head lamp are mounted, a front fender apron member that forms both side portions of the left and the right of the engine compartment and in which a suspension system is mounted, and provides a portion in which wheels are disposed, and a dash panel that is located at the rear side of the engine compartment to partition a passenger compartment from the engine compartment.

Further, at a lower portion of the engine compartment, front side members which extend in a length direction of the vehicle are disposed to both sides of the left and the right to reinforce structural rigidity of the front side of the vehicle body, and to mount and support a suspension system as well as the engine and transmission that are disposed in the engine compartment, and a sub-frame is disposed at a lower portion of the front side member.

A first end of the front fender apron member is disposed and coupled with an upper portion of a predetermined portion in a length direction of the front side member, and a second end thereof is connected with a front filler.

At a front end portion of the front side of the front side member, to improve a collision corresponding performance of the vehicle, a bumper beam which extends in a width direction of the vehicle is mounted. When a vehicle having a front vehicle body of the above structure forward collides with an obstacle or another vehicle while driving, the bumper beam absorbs impact energy while preferentially receiving an impact and being deformed, the impact energy is transferred evenly to the front side member through the bumper beam, the front side member absorbs impact energy while receiving an impact and being deformed, and the impact energy that is not absorbed by the front side member is distributed and absorbed to other portions of the vehicle body such as the front fender apron member or the front filler that are connected with the front side member.

However, because the conventional front side vehicle body structure has a connection structure in which a front end portion of the front side of a front fender apron member is simply disposed and coupled to an upper portion of a predetermined portion according to a length direction of a front side member, connectivity of the front side member and the front fender apron member is weak.

Therefore, since impact energy transferred to the front side member is not appropriately distributed to the front fender apron member and other portions of the vehicle body, the front side member receives a majority of the impact energy and is excessively deformed and damaged.

Further, because a front end portion of the rear side, according to a length direction of the vehicle, of the front side member is connected with a dash panel that divides an engine compartment and a passenger compartment, impact energy is excessively transferred to the dash panel through the front side member, and thus the dash panel receives impact energy and is a threat to the safety of passengers boarding in the passenger compartment while being excessively deformed toward the passenger compartment.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

Various aspects of the present invention are directed to providing a vehicle body reinforcement structure corresponding to a small overlap collision that can safely protect a passenger when a front side collision accident of the vehicle occurs by improving a front side collision corresponding performance of a vehicle us an improved connectivity reinforcement between a front fender apron member and a front side member, and a distribution performance of impact energy.

Various aspects of the present invention are directed to providing a vehicle body reinforcement structure corresponding to a small overlap collision including: side members that are disposed at both sides of the front side of a vehicle body and whose front end surface is bonded to a rear surface of a crash box bracket; an external cover whose upper and external edge portions of a front surface are bonded to a rear surface of the crash box bracket, and in which a cover slanted surface gradually receding from a rear surface of the crash box bracket is formed from an upper edge portion to the lower side at a rear surface thereof and whose internal edge portion is bonded to the outside of the side member; and a fender apron member that is disposed at the outside of the side member and in which at an upper end portion of the front side, an upper bonding portion that is bonded to an upper portion of the external cover, a lower bonding portion and that is bonded to a lower portion of a rear surface of the external cover are formed, and a slanted bonding portion that is bonded to the cover slanted surface of the external cover are formed.

The vehicle body reinforcement structure may further include: a bolt upper bracket that is bonded to an external side surface of a lower portion of the side member; a bolt lower bracket that is disposed at a lower portion of the bolt upper bracket; and a mounting bolt whose lower end portion is engaged with the bolt lower bracket, and whose upper end portion is engaged with the bolt upper bracket which is engaged with a sub-frame.

An internal side surface of the external cover may be bonded to the bolt upper bracket and the bolt lower bracket.

A front surface of the bolt lower bracket and the bolt upper bracket may be bonded to a lower portion of a rear surface of the crash box bracket.

A rear surface of the bolt lower bracket may be bonded to a front surface of a lower portion of the external cover.

The vehicle body reinforcement structure may further include an internal cover whose external side surface of an upper portion is bonded to a lower portion of the front end portion of the side member and whose internal side surface of a lower portion of the rear side is bonded to a lower portion of an edge portion of the inside of the external cover and whose front surface is bonded to a rear surface of the crash box bracket.

an internal side surface of a lower end portion of the internal cover may be bonded to the bolt lower bracket.

At a front end portion of the fender apron member, an internal side surface may be bonded to an external side surface of the side member.

an internal side surface of an internal edge portion of the external cover may be bonded to an external side surface of the side member, and an external side surface of an internal edge portion of the external cover may be bonded to an internal side surface of the fender apron member.

The side member may include: a side internal member that is disposed at the inside of a vehicle body; and a side external member that is bonded to the outside of the side internal member.

The fender apron member may include: a fender apron internal member that is disposed at the inside of the vehicle body and that is bonded to the side member; and a fender apron external member that is bonded to the outside of the fender apron internal member.

The mounting bolt may be connected to a sub-frame in which an engine is disposed.

According to an exemplary embodiment of the present invention for achieving such an object, by improving a front side collision corresponding performance of a vehicle using improved connectivity reinforcement between a front fender apron member and a front side member and a distribution performance of impact energy, when a front side collision accident of the vehicle occurs, a vehicle body reinforcement structure according to an exemplary embodiment of the present invention can effectively correspond to a small overlap collision that can more safely protect a passenger.

The methods and apparatuses of the present invention have other features and advantages which will be apparent from or are set forth in more detail in the accompanying drawing, which are incorporated herein, and the following Detailed Description, which together serve to explain certain principles of the present invention.

Figure 1:
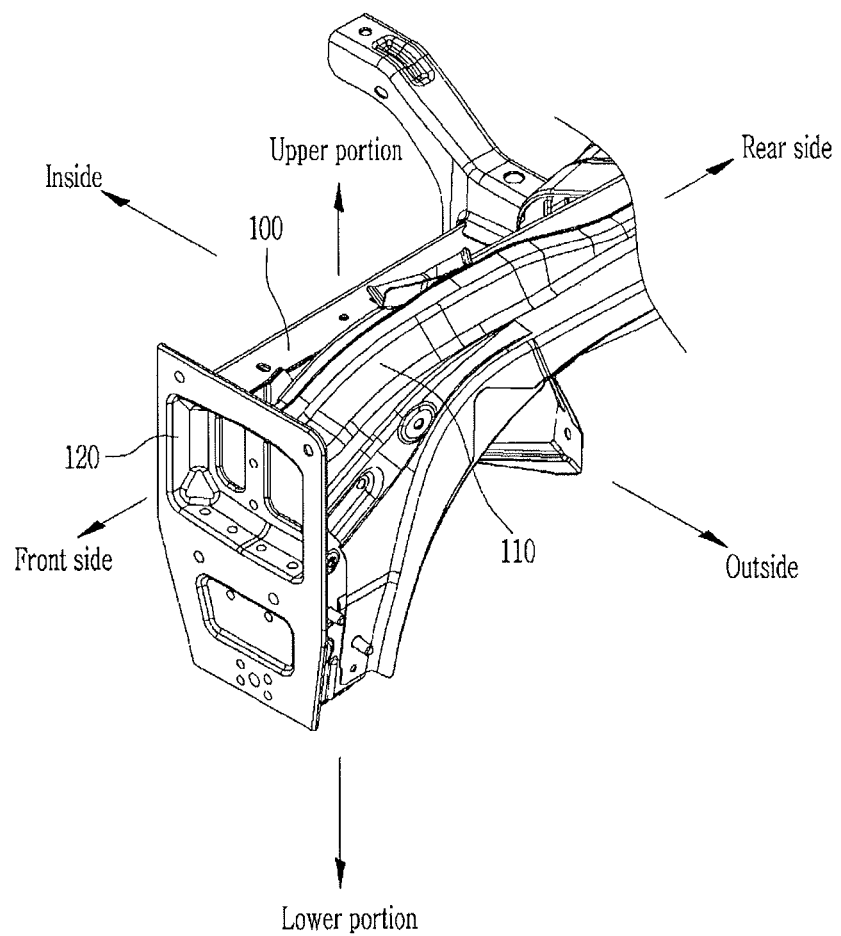
FIG. 1 is a partially perspective view of a vehicle body reinforcement structure corresponding to a small overlap collision according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In the following description, terms including a first and a second used in names of constituent elements are used for distinguishing constituent elements having the same name, and do not limit order thereof.

FIG. 1 is a partially perspective view of a vehicle body reinforcement structure corresponding to a small overlap collision according to an exemplary embodiment of the present invention.

Referring to FIG. 1, the vehicle body reinforcement structure includes a side member 100, a fender apron member 110, and a crash box bracket 120 as constituent elements. Here, an entire structure and function of the side member 100 and the fender apron member 110 are the same as those of the conventional art and therefore a detailed description thereof will be omitted.

A front surface of the crash box bracket 120 is bonded to a rear surface of a crash box, and a rear surface of the crash box bracket 120 is bonded to a front end surface 350 (see FIG. 4) of the side member 100.

The side member 100 is disposed internal to a vehicle body, and the fender apron member 110 is disposed external to a vehicle body. For convenience of description, it is assumed that a center portion of a vehicle body is the inside. Here, an external side surface of the side member 100 may be bonded to an internal side surface of the fender apron member 110.

During the vehicle forward collision, when an impact energy is transferred to the crash box bracket 120, the impact energy is transferred to the front end surface 350 (see FIG. 4) of the side member 100 that is bonded to a rear surface of the crash box bracket 120, and is transferred to a front portion of the fender apron member 110 that is bonded to an external side surface of the side member 100.

A detailed structure of a vehicle body reinforcement structure will be described with reference to FIG. 2 to FIG. 5.

Figure 2:
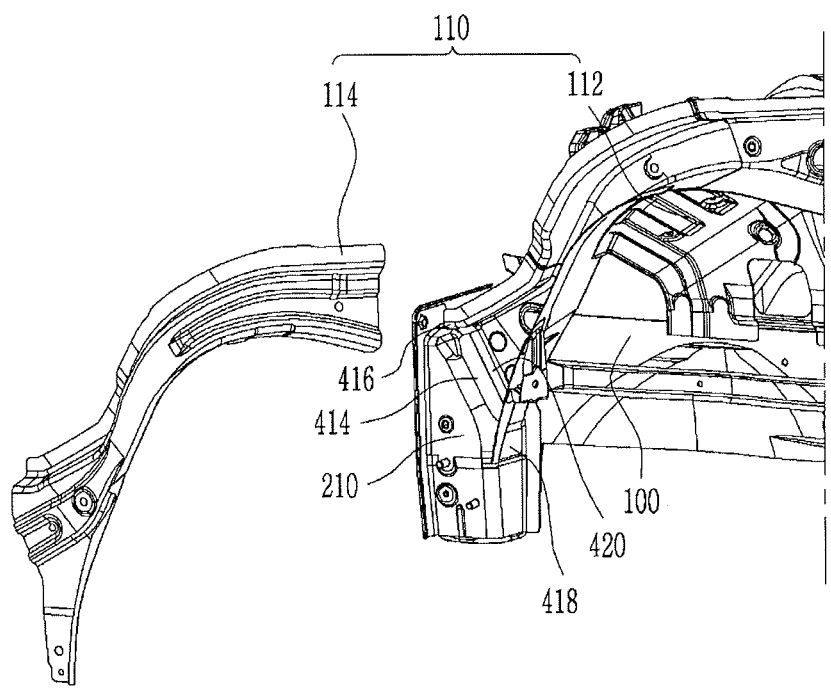
FIG. 2 is a partially exploded perspective view of a vehicle body reinforcement structure corresponding to a small overlap collision according to an exemplary embodiment of the present invention.

FIG. 2 is a partially exploded perspective view of a vehicle body reinforcement structure corresponding to a small overlap collision according to an exemplary embodiment of the present invention.

Referring to FIG. 2, an external cover 210 is bonded to the outside of a rear surface of the crash box bracket 120.

At a front surface of the external cover 210, an upper edge portion 411 and an external edge portion 412 are bonded to a rear surface of the crash box bracket 120, and at a rear surface thereof, a cover slanted surface 414 gradually receding from a rear surface of the crash box bracket 120 is formed from an upper portion to a lower portion.

In an exemplary embodiment of the present invention, the fender apron member 110 includes a fender apron internal member 112 and a fender apron external member 114, and the fender apron internal member 112 and the fender apron external member 114 are bonded to each other. At a front end portion of the fender apron internal member 112, in an upper portion thereof, an upper bonding portion 416 is formed, in a lower portion thereof, a lower bonding portion 418 is formed, and a slanted bonding portion 420 is formed between the upper bonding portion 416 and the lower bonding portion 418.

A lower surface of the upper bonding portion 416 is bonded to an upper surface of the external cover 210, a front end surface of the upper bonding portion 416 is bonded to a rear surface of the crash box bracket 120 or a rear surface of an upper portion of the external cover 210, and the lower bonding portion 418 is bonded to a rear surface of a lower portion of the external cover 210. A front surface of the slanted bonding portion 420 may be bonded to the cover slanted surface 414 of the external cover 210.

Figure 3:
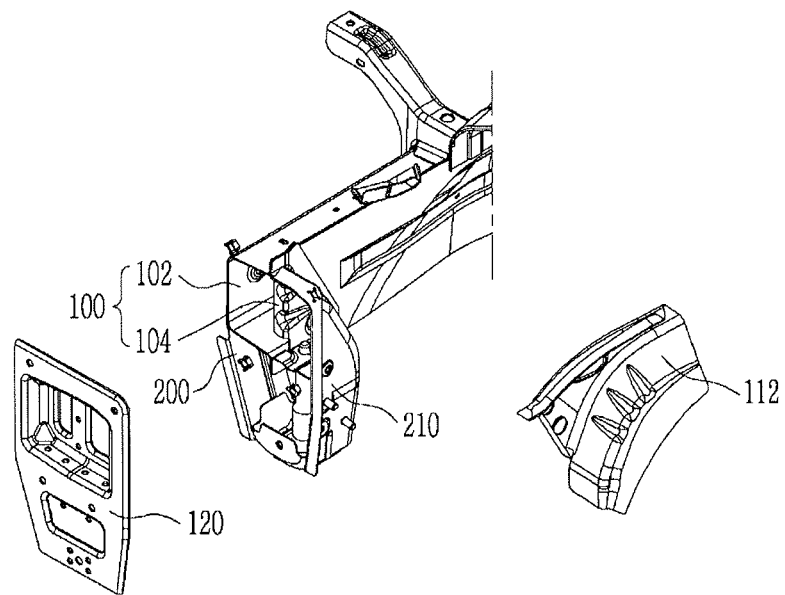
FIG. 3 is a partially exploded perspective view of a vehicle body reinforcement structure corresponding to a small overlap collision according to an exemplary embodiment of the present invention.

FIG. 3 is a partially exploded perspective view of a vehicle body reinforcement structure corresponding to a small overlap collision according to an exemplary embodiment of the present invention.

Referring to FIG. 3, the side member 100 includes a side internal member 102 that is disposed at the inside and a side external member 104 that is disposed at the outside thereof and that is bonded to the side internal member 102.

A bolt upper bracket 305 is bonded from the front end portion of the side member 100 to a lower portion of an external side surface, a bolt lower bracket 310 is disposed at a lower portion of the bolt upper bracket 305, an upper portion of a mounting bolt 300 is engaged with the bolt upper bracket 305, and the bolt lower bracket 310 is engaged with a lower portion of the mounting bolt 300.

The external cover 210 is disposed to enclose the outside of the bolt upper bracket 305, the bolt lower bracket 310, and the mounting bolt 300, an internal edge portion 425 is bonded to an external side surface of the side member 100, and the upper edge portion 411 and the external edge portion 412 of a front surface portion have a structure that is bonded to a rear surface of the crash box bracket 120.

An upper portion of an internal cover 200 is bonded to an internal side surface of the side member 100, a lower portion of the internal cover 200 is bonded to the bolt lower bracket 310, and the inside of the rear side of the internal cover 200 is extended to the outside to be bonded to the external cover 210.

Figure 4:
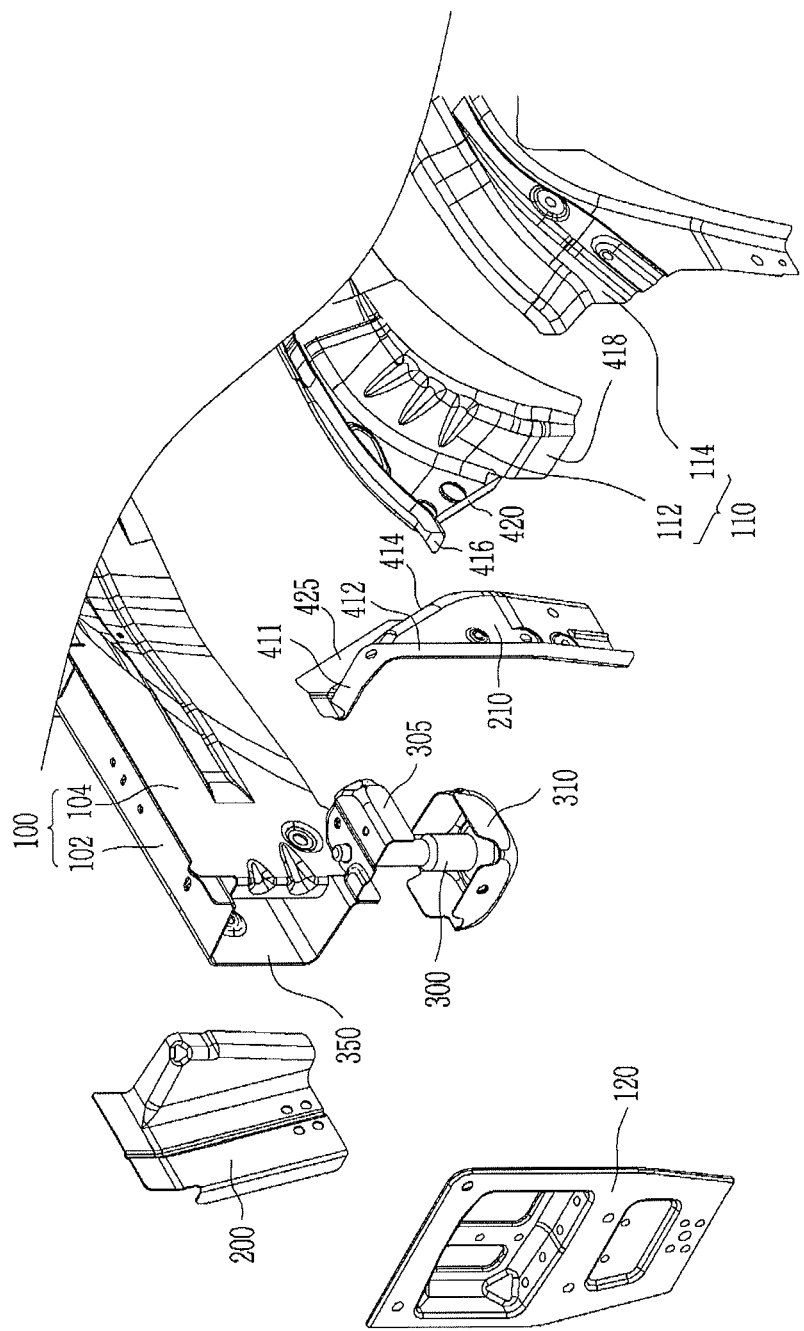
FIG. 4 is an entire exploded perspective view of a vehicle body reinforcement structure corresponding to a small overlap collision according to an exemplary embodiment of the present invention.

FIG. 4 is an entire exploded perspective view of a vehicle body reinforcement structure corresponding to a small overlap collision according to an exemplary embodiment of the present invention.

Referring to FIG. 4, the vehicle body reinforcement structure includes a crash box bracket 120, a bolt upper bracket 305, a mounting bolt 300, a bolt lower bracket 310, a side member 100, an internal cover 200, an external cover 210, and a fender apron member 110 as constituent elements. The front end surface 350 of the side member 100 is bonded to a rear surface of the crash box bracket 120.

At the external cover 210, the external edge portion 412 and the upper edge portion 411 are formed, and the external edge portion 412 and the upper edge portion 411 have a surface structure that is bonded to a rear surface of the crash box bracket 120. The internal edge portion 425 of the external cover 210 is bonded to an external side surface of the side member 100.

A front surface of the internal cover 200 is bonded to a rear surface of the crash box bracket 120, an external side surface of a rear end portion of the internal cover 200 is bonded to a lower surface of the internal edge portion 425 of the external cover 210, and an upper surface of one side of the internal cover 200 is bonded to a lower surface of the side member 100.

The bolt upper bracket 305 is bonded to a lower portion of an external side surface of the side member 100, the bolt lower bracket 310 is disposed at a lower portion of the bolt upper bracket 305, an upper portion of the mounting bolt 300 is engaged with the bolt upper bracket 305, and a lower portion of the mounting bolt 300 is engaged with the bolt lower bracket 310.

External side surfaces of the bolt upper bracket 305 and the bolt lower bracket 310 are bonded to an internal side surface of the external cover 210. Further, front surfaces of the bolt upper bracket 305 and the bolt lower bracket 310 are each bonded to a rear surface of the crash box bracket 120. Further, an internal side surface of the bolt lower bracket 310 is bonded to an external side surface of a lower portion of the internal cover 200.

The fender apron member 110 includes a fender apron internal member 112 that is disposed at the inside and a fender apron external member 114 that is bonded to the fender apron internal member 112 and that is disposed at the outside, and in a front end portion of the fender apron internal member 112, in an upper portion thereof, an upper bonding portion 416 is formed, in a lower portion thereof, a lower bonding portion 418 is formed, and in an intermediate portion thereof, a slanted bonding portion 420 gradually receding from a rear surface of the crash box bracket 120 is formed from an upper portion to a lower portion.

The upper bonding portion 416 is bonded to the external cover 210 or the crash box bracket 120, the lower bonding portion 418 is bonded to a rear surface of a lower portion of the external cover 210, and the slanted bonding portion 420 is bonded to the cover slanted surface 414 that is formed at a rear surface of the external cover 210.

Therefore, an external impact that is transferred to the crash box bracket 120 is distributed to the side member 100, the external cover 210, and the fender apron member 110 to effectively distribute the entire impact energy.

Further, collision energy that is transferred to the bolt upper bracket 305, the mounting bolt 300, and the bolt lower bracket 310 may be distributed to a sub-frame in which an engine is disposed.

Figure 5:
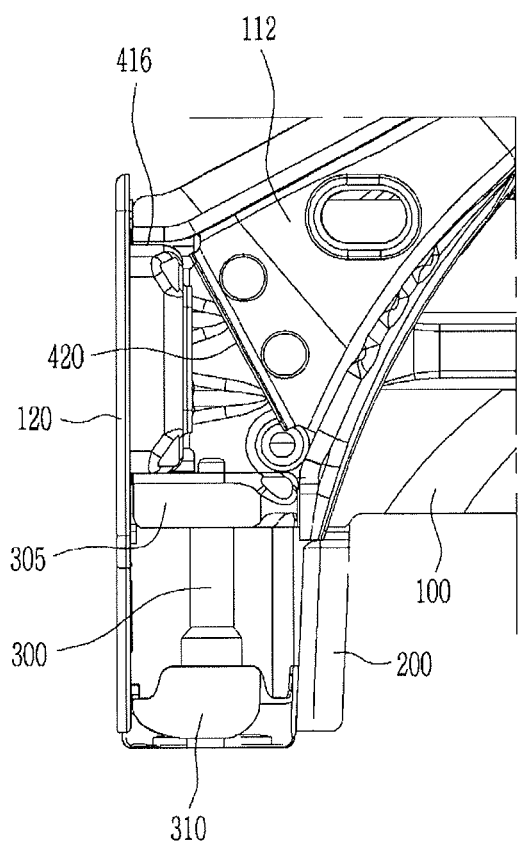
FIG. 5 is a side view of a vehicle body reinforcement structure corresponding to a small overlap collision according to an exemplary embodiment of the present invention.

FIG. 5 is a side view of a vehicle body reinforcement structure corresponding to a small overlap collision according to an exemplary embodiment of the present invention. FIG. 5 is a side view of an assembly whose external cover is removed and viewed from the outside.

Referring to FIG. 5, in an upper portion of the fender apron internal member 112, an upper bonding portion 416 is formed, and the upper bonding portion 416 is bonded to a rear surface of the crash box bracket 120 through the external cover 210.

At a lower portion of the fender apron internal member 112, a lower bonding portion 418 is formed, and the lower bonding portion 418 is bonded to a lower portion of a rear surface of the external cover 210.

Further, a slanted bonding portion 420 gradually receding from a rear surface of the crash box bracket 120 is formed from an upper portion to a lower portion between the lower bonding portion 418 and the upper bonding portion 416, and the slanted bonding portion 420 is bonded to the cover slanted surface 414 that is formed at a rear surface of the external cover 210.

an internal side surface of the fender apron member 110 is bonded to an external side surface of the side member 100.

Therefore, collision energy that is transferred to the crash box bracket 120 is distributed to the fender apron member 110 and the side member 100 through the external cover 210. Further, collision energy is distributed to a sub-frame through the bolt upper bracket 305, the mounting bolt 300, and the bolt lower bracket 310.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body reinforcement structure corresponding to a small overlap collision, the vehicle body reinforcement structure comprising:
   side members that are disposed at a first side and a second side of a front side of a vehicle body and whose front end surface is bonded to the rear surface of a crash box bracket;
   an external cover whose upper and external edge portions of a front surface are bonded to a rear surface of the crash-box bracket and in which a cover slanted surface receding from the rear surface of the crash box bracket is formed from an upper edge portion to a lower side at a rear surface thereof and whose internal edge portion is bonded to an outside of the side members; and
   a fender apron member that is disposed at the outside of the side member and in which at an upper end portion of the front side, an upper bonding portion that is bonded to an upper portion of the external cover, a lower bonding portion and that is bonded to a lower portion of the rear surface of the external cover are formed, and a slanted bonding portion that is bonded to the cover slanted surface of the external cover are formed,
   wherein an internal side surface of the internal edge portion of the external cover is bonded to an external side surface of the side member, and an external side surface of the internal edge portion of the external cover is bonded to an internal side surface of the fender apron member.

2. The vehicle body reinforcement structure of claim 1, further including:
   a bolt upper bracket that is bonded to an external side surface of a lower portion of the side member;
   a bolt lower bracket that is disposed at a lower portion of the bolt upper bracket; and
   a mounting bolt whose lower end portion is engaged with the bolt lower bracket and whose upper end portion is engaged with the bolt upper bracket and that is engaged with a sub-frame.

3. The vehicle body reinforcement structure of claim 2, wherein an internal side surface of the external cover is bonded to the bolt upper bracket and the bolt lower bracket.

4. The vehicle body reinforcement structure of claim 2, wherein a front surface of the bolt lower bracket and the bolt upper bracket is bonded to a lower portion of the rear surface of the crash box bracket.

5. The vehicle body reinforcement structure of claim 2, wherein a rear surface of the bolt lower bracket is bonded to a front surface of a lower portion of the external cover.

6. The vehicle body reinforcement structure of claim 2, further including an internal cover whose external side surface of an upper portion thereof is bonded to a lower portion of a front end portion of the side member and whose internal side surface of a lower portion of a rear side is bonded to a lower portion of an edge portion of the inside of the external cover and whose front surface is bonded to the rear surface of the crash box bracket.

7. The vehicle body reinforcement structure of claim 6, wherein an internal side surface of a lower end portion of the internal cover is bonded to the bolt lower bracket.

8. The vehicle body reinforcement structure of claim 1, wherein at a front end portion of the fender apron member, an internal side surface is bonded to an external side surface of the side member.

9. The vehicle body reinforcement structure of claim 1, wherein the side member includes:
   a side internal member that is disposed at an inside of a vehicle body; and
   a side external member that is bonded to an outside of the side internal member.

10. The vehicle body reinforcement structure of claim 1, wherein the fender apron member includes:
    a fender apron internal member that is bonded to the side member; and
    a fender apron external member that is bonded to an outside of the fender apron internal member.

11. The vehicle body reinforcement structure of claim 2, wherein the mounting bolt is connected to a sub-frame in which an engine is disposed.

* * * * *